(12) United States Patent
Hanna et al.

(10) Patent No.: US 10,946,984 B2
(45) Date of Patent: Mar. 16, 2021

(54) METHOD OF REPAIRING A COMPOSITE MATERIAL

(71) Applicant: SHORT BROTHERS PLC, Belfast (GB)

(72) Inventors: Samuel Colin Hanna, Bangor (GB); John A. Armstrong, Bangor (GB); Steven Robb, Crumlin (GB); Tom Brown, Glenavy Antrim (GB)

(73) Assignee: SHORT BROTHERS PLC, Belfast (GB)

( * ) Notice: Subject to any disclaimer, the term of this patent is extended or adjusted under 35 U.S.C. 154(b) by 254 days.

(21) Appl. No.: 15/760,589

(22) PCT Filed: Sep. 12, 2016

(86) PCT No.: PCT/GB2016/052809
§ 371 (c)(1),
(2) Date: Mar. 15, 2018

(87) PCT Pub. No.: WO2017/046573
PCT Pub. Date: Mar. 23, 2017

(65) Prior Publication Data
US 2018/0273207 A1 Sep. 27, 2018

(30) Foreign Application Priority Data

Sep. 16, 2015 (GB) ..................... 1516391

(51) Int. Cl.
*B29C 73/10* (2006.01)
*B64F 5/40* (2017.01)
(Continued)

(52) U.S. Cl.
CPC ............ *B64F 5/40* (2017.01); *B29C 65/5021* (2013.01); *B29C 65/5092* (2013.01);
(Continued)

(58) Field of Classification Search
CPC ....... B64F 5/40; B29C 65/5021; B29C 73/10; B29C 73/26
See application file for complete search history.

(56) References Cited

U.S. PATENT DOCUMENTS 4,789,918 A 12/1988 Bannink, Jr.
4,912,594 A 3/1990 Bannink, Jr. et al.
(Continued)

FOREIGN PATENT DOCUMENTS

EP 2363429 A1 9/2011
WO 2008048705 A2 4/2008

OTHER PUBLICATIONS

International Search Report and Written Opinion dated Dec. 5, 2016, for International Patent Application No. PCT/GB2016/052809.
(Continued)

*Primary Examiner* — Jeffry H Aftergut
*Assistant Examiner* — Jaeyun Lee
(74) *Attorney, Agent, or Firm* — Hovey Williams LLP (57) ABSTRACT

A method of repairing damage to a composite material having a composite substrate and at least one layer of shielding material includes: a) removing damage to the at least one layer of shielding material by creating a hole in the at least one layer of shielding material; b) applying a patch of shielding material in the region of the hole via a resin, wherein a ratio of a resin weight to a weight of the patch of shielding material lies in a range between about 0.45-0.55; and c) curing the resin, wherein an absorptive, consumable material is positioned in contact with the resin during at least a portion of the curing.

26 Claims, 5 Drawing Sheets

(51) Int. Cl.
  *B29C 65/50* (2006.01)
  *B29C 73/26* (2006.01)
  *B29L 31/30* (2006.01)
(52) U.S. Cl.
  CPC .............. *B29C 73/10* (2013.01); *B29C 73/26* (2013.01); *B29C 2073/262* (2013.01); *B29C 2073/264* (2013.01); *B29L 2031/3076* (2013.01)

(56) References Cited

U.S. PATENT DOCUMENTS

| | | | |
|---|---|---|---|
| 5,732,743 A | 3/1998 | Livesay | |
| 5,865,397 A * | 2/1999 | Herrmann | B64C 3/26 |
| | | | 244/121 |
| 6,174,392 B1 | 1/2001 | Reis | |
| 7,934,676 B2 | 5/2011 | Dufresne et al. | |
| 2004/0141278 A1* | 7/2004 | Grosse | H05F 3/04 |
| | | | 361/213 |
| 2006/0078705 A1 | 4/2006 | Glatkowski et al. | |
| 2007/0093163 A1 | 4/2007 | Brown | |
| 2007/0141927 A1* | 6/2007 | Brown | B32B 3/266 |
| | | | 442/6 |
| 2007/0177330 A1 | 8/2007 | Ackerman et al. | |
| 2007/0281122 A1* | 12/2007 | Blanchard | B64F 5/40 |
| | | | 428/63 |
| 2007/0289692 A1 | 12/2007 | Bogue et al. | |
| 2009/0123745 A1 | 5/2009 | Gehrett et al. | |
| 2011/0186206 A1 | 8/2011 | Ackerman et al. | |
| 2012/0080135 A1* | 4/2012 | Evens | B32B 37/10 |
| | | | 156/94 |
| 2012/0132344 A1 | 5/2012 | Deleris et al. | |
| 2012/0305169 A1 | 12/2012 | Hanks et al. | |
| 2013/0255856 A1 | 10/2013 | Whitworth et al. | |
| 2014/0141190 A1 | 5/2014 | Shigetomi et al. | |
| 2014/0290831 A1 | 10/2014 | Hatano et al. | |
| 2014/0290832 A1 | 10/2014 | Arikawa et al. | |
| 2014/0290851 A1 | 10/2014 | Takagi et al. | |
| 2014/0295123 A1 | 10/2014 | Mizuno et al. | |
| 2014/0295124 A1 | 10/2014 | Suhara et al. | |
| 2014/0295125 A1 | 10/2014 | Arikawa et al. | |
| 2015/0090392 A1 | 4/2015 | Bertrand et al. | |
| 2015/0136308 A1 | 5/2015 | Bremmer et al. | |
| 2015/0185128 A1* | 7/2015 | Chang | G01N 3/066 |
| | | | 702/35 |
| 2016/0362584 A1* | 12/2016 | Quinn | C09J 7/30 |

OTHER PUBLICATIONS

United Kingdom Search Report dated Mar. 11, 2016, for United Kingdom Patent Application No. GB 1516391.8.

* cited by examiner

METHOD OF REPAIRING A COMPOSITE MATERIAL

CROSS-REFERENCE TO RELATED APPLICATION(S)

This patent application is a national stage entry from International Patent Application No. PCT/GB2016/052809, filed on Sep. 12, 2016, and which claims priority to GB patent application no. 1516391.8 filed Sep. 16, 2015, the entire content of both of which are incorporated herein by reference.

FIELD OF THE INVENTION

The present invention concerns one or more methods of repairing a composite material by applying a shielding material (e.g., an expanded foil layer, such as a copper foil layer) to the composite material. In addition, the present invention concerns one or more methods for repairing the shielding material layers that are typically incorporated into composite materials used for the construction of aircraft. The present invention also encompasses the resulting repair.

BACKGROUND OF THE INVENTION

As should be apparent to those skilled in the construction of aircraft from composite materials, there are areas on the aircraft, particularly the skin of the aircraft, where a shielding material is embedded in the skin of the aircraft.

Since composite materials are not particularly conductive, the shielding material provides an electromagnetic interference ("EMI") shield for the aircraft. The shielding material conducts an electrical current, dissipates the buildup of any electrical charge, provides electromagnetic protection for systems within the aircraft, and minimizes damage to the composite structure. The shielding material provides other advantages, as should be apparent to those skilled in the art.

Should the composite material become damaged, it becomes necessary to repair the composite material. Damage to the composite material may result from lightning strikes on the aircraft or cracking from mechanical stresses, among others.

If the shielding material is damaged, it also becomes necessary to repair the shielding material so that the repaired shielding material properly interfaces with the shielding material existing in/on the undamaged composite structure. A proper interface reestablishes the electrical properties of the composite material to desirable levels, once the repair is complete.

Existing methods of repairing shielding materials have been deficient in re-establishing acceptable electrical properties for the repair, establishing acceptable surface finishes and/or in providing ease of repair for maintenance/repair personnel.

Accordingly, an improved method for repair of a composite material incorporating a shielding material is provided herein.

SUMMARY OF THE INVENTION

The present invention addresses, at least in part, one or more of the deficiencies with respect to the prior art.

In particular, in one aspect, the disclosure describes a method for repairing damage to a composite material comprising a composite substrate and at least one layer of shielding material, the method comprising:

removing damage to the at least one layer of shielding material by creating a hole in the at least one layer of shielding material;

applying a patch of shielding material in the region of the hole via a resin, wherein a ratio of a resin weight to a weight of the patch of shielding material lies in a range between about 0.45-0.55; and curing the resin, wherein an absorptive, consumable material is positioned in contact with the resin during at least a portion of the curing.

The at least one layer of shielding material may comprise a layer of a first shielding material and a layer of a second shielding material, wherein the method further comprises:

creating a first hole in the layer of the first shielding material; and creating a second hole in the layer of the second shielding material.

The first hole may be smaller than the second hole.

The layer of the first shielding material may be an enhanced layer of shielding material in comparison to the layer of the second shielding material.

The patch may comprise a first layer and a second layer. The method further comprises dimensioning the first layer of the patch to fit within the first hole or to be larger than the first hole.

The first layer of the patch may comprise the first shielding material and the second layer of the patch may comprise the second shielding material.

The second layer of the patch may be dimensioned to be larger than the second hole, so as to overlie the layer of second shielding material of the composite material.

The second layer of the patch may be larger than the first layer of the patch by a minimum distance of between 1.0-3.0 (25.4-76.2 mm) on all sides.

The first shielding material and the second shielding material may comprise copper foil.

The composite substrate may comprise carbon fiber.

The method may further comprise creating a bag up wherein the absorptive, consumable material is positioned between an assembly of the resin and patch, and a release film.

The method may further comprise dimensioning the first layer of the patch to fit within the hole in a layer of the second shielding material of the composite material.

The layer of the first shielding material may be a metallic foil having a weight of between 0.1 to 0.5 $lb/ft^2$.

The layer of the first shielding material may be a metallic foil having a weight of between 0.2 and 0.4 $lb/ft^2$.

The layer of the second shielding material may be a metallic foil having a weight of between 0.02 to 0.05 $lb/ft^2$.

The layer of the second shielding material may be a metallic foil having a weight of between 0.02 and 0.035 $lb/ft^2$.

Further aspects of the present invention will be made apparent from the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

In broad, non-limiting terms, the present invention is contemplated to encompass several different repairs to composite materials and also several methods that may be employed to effectuate those repairs. In one embodiment, the present invention encompasses a repair of a composite material that includes two or more layers of shielding material. In a second contemplated embodiment, the present invention addresses a repair of a composite material including only a single layer of shielding material. In a third contemplated embodiment, the present invention addresses the addition of an enhanced shielding material to a composite material that does not normally include any enhanced shielding material. To these ends, the present invention also is contemplated to encompass one or more patches made from and/or incorporating one or more shielding materials.

By way of example, shielding materials encompass, but are not limited to metallic foils and meshes for lightning protection of composite components on aircraft.

Also without limitation of the instant disclosure, the present invention is contemplated to encompass a ratio of a weight of a resin to a weight of the shielding material used for the repair. More specifically, the present invention is contemplated to encompass the bonding of shielding materials to a composite substrate using a predetermined ratio by weight of a mixed resin to the shielding material. The present invention contemplates that the shielding materials are fully bonded to the composite substrate, that the shielding materials are fully encapsulated within the resin, that there is an adequately close contact between the repair shielding materials to assure acceptable electromagnetic interference performance (meeting predetermined criteria), and that post cure rework of the repaired area meets aerodynamic and cosmetic requirements with minimized additional effort.

Without limiting the present invention, it is contemplated that the bonding of the shielding materials to the composite substrate may or may not require the use of one or more consumable materials, such as one or more release films and/or fabrics. Release films and/or fabrics assist with the curing of the resin by helping to assure that a controlled quantity of excess resin is removed from the repair prior to curing and that any bagging materials employed during the curing process are not adhered to the cured resin. Release films also may help to minimize any post cure work to the repair area.

In view of the broad, non-limiting overview provided above, the present invention will now be described in connection with one or more embodiments.

Figure 1:
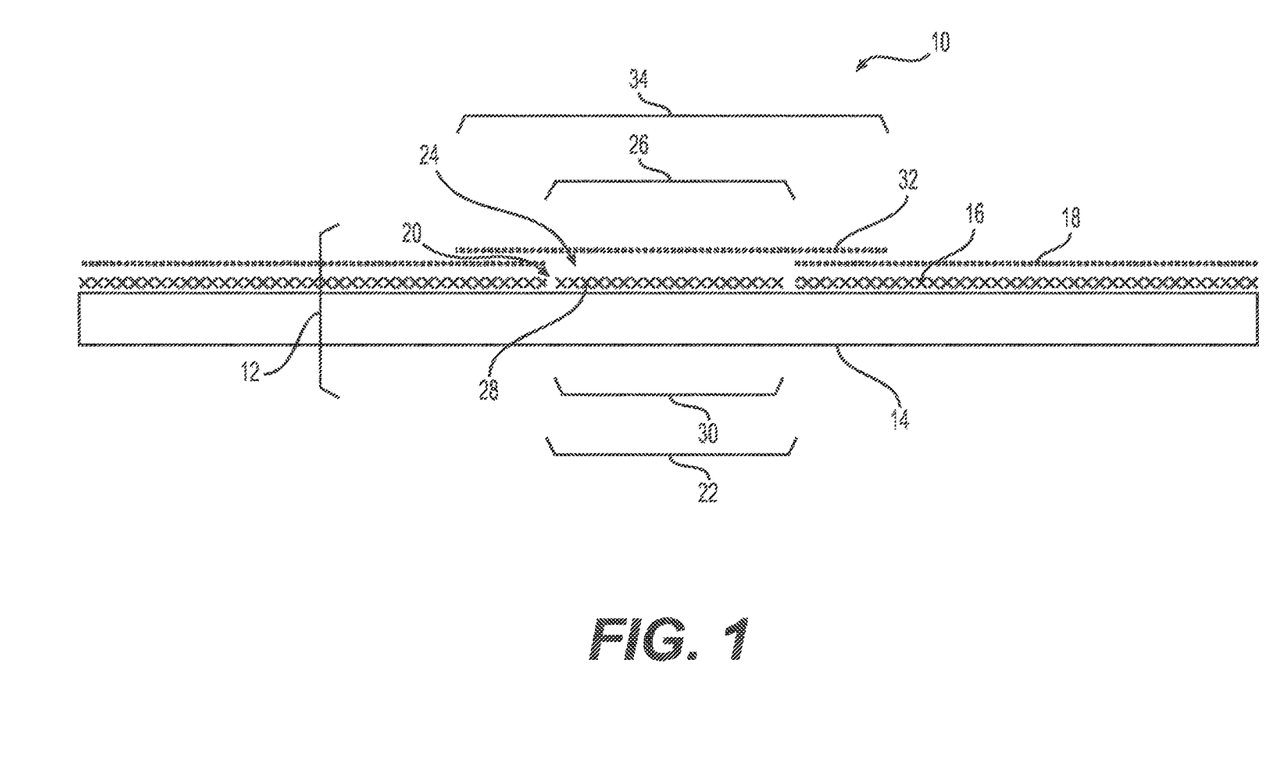
FIG. 1 is a graphical, side view of a first embodiment of a repair according to the teachings of the present invention.

FIG. 1 is a graphical, side view illustration of a first repair 10 of a composite material 12 according to the present invention. As shown in FIG. 1, the composite material 12 comprises a composite substrate 14, a layer of a first shielding material 16 and a layer of a second shielding material 18 deposited thereon.

In the context of the first repair 10, the composite material 12 encompasses at least the composite substrate 14, the layer of the first shielding material 16, the layer of the second shielding material 18, and any matrix agent, such as one or more resins that, once cured, bind the layers together. As should be apparent to those skilled in the art, the resin is not illustrated in FIG. 1.

For clarity, the present invention should not be understood to be limited solely to the combination and/or construction of the composite material illustrated in FIG. 1. Other combinations and/or constructions are contemplated to be encompassed by the present invention. For example, the composite material 12 may include two or more substrates 14, two or more layers of the first shielding material 16, and/or two or more layers of the second shielding material 18.

In addition, it is noted that the particular order in which the composite substrate 14, the layer of the first shielding material 16, and the layer of the second shielding material 18 are layered onto one another is not critical to the present invention. While the illustrated embodiments depict the constructions that are contemplated to be most commonly encountered, the present invention should not be considered to be limited solely thereto.

Before discussing the various aspects of the first repair 10, a non-limiting overview of various aspects of the components that make up the composite material 12 is provided.

The composite substrate 14 is contemplated to include one or more layers of fiber fabric embedded in a cured resin matrix. The fiber fabric is contemplated to be a carbon fiber fabric. However, other fabrics, whether woven or not, are contemplated to fall within the scope of the present invention. For example, aramid fibers, glass fibers, and nylon fibers, among others, are contemplated to be alternatives that may be employed without departing from the scope of the present invention. Still further the composite substrate 14 may combine multiple different types of fiber materials without departing from the intended scope of the present invention.

The resin binding the layers forming the composite substrate is contemplated to be a thermoset resin. Alternatively, a thermoplastic resin may be employed. Other resins also may be employed without departing from the scope of the present invention.

While the composite substrate 14 is contemplated to be made from a fiber fabric made from a single material, such as carbon fiber embedded in a cured resin, the composite material 14 is not limited thereto. Different types of fabrics may be combined together to form the composite substrate 14. Separately, it is contemplated that the composite substrate 14 may combine non-fabric materials, such as honeycomb materials, together with one or more of the fabric layers described above.

The first shielding material 16 is contemplated to be a copper foil. In accordance with a non-limiting embodiment, the first shielding material 16 may be a copper foil material having a weight of between 0.1 to 0.5 lb/ft$^2$. More specifically, the first shielding material may be a copper foil material having a weight of between 0.2 and 0.4 lb/ft$^2$. While copper is contemplated for the first shielding material 16, the first shielding material 16 may be made from any other suitable metal without departing from the scope of the present invention. Other materials contemplated for the shielding material 16 include, for example, aluminum, nickel, iron, alloys of copper, alloys of aluminum, alloys of nickel, alloys of iron, steel, etc. For purposes of the present invention, the shielding material 16 may be made from any other conductive metallic material or alloy.

As noted, the first shielding material 16 is contemplated to be a copper foil. Within the discussion that follows, a foil is contemplated to be a single layer of material. The foil may be perforated, patterned, embossed, or otherwise manufactured to provide one or more desirable properties including, but not limited to, the ability for the foil to stretch in response to thermal and/or mechanical stresses and strains. Alternatively, the layer of the first shielding material 16 may be made from a woven mesh material. In other words, the layer of the first shielding material 16 need not be constructed as a metal foil. As a woven mesh material, the layer of the first shielding material 16 may be made from metal wires woven into a fabric. According to one other alternative, the layer of first shielding material 16 may result from the weaving of flat metal strips into a woven fabric. Still further, the layer of the first shielding material 16 may be a perforated and expanded foil, a drilled material, or any other material with perforations formed by a process that results in a porous surface. To this end, the layer of the first shielding material 16 may be constructed via any number of different methodologies, all of which are contemplated to fall within the scope of the present invention.

The second shielding material 18 is contemplated to share the same compositional properties as the first shielding material 16. In particular, the second shielding material 18 is contemplated to be a copper foil.

Like the first shielding material 16, the second shielding material 18 may be made from alternative materials. Those materials include, but are not limited to, metals, alloys, aluminum, nickel, iron, alloys of copper, alloys of aluminum, alloys of nickel, alloys of iron, steel, etc. As in the case of the first shielding material 16, the second shielding material may be constructed as a foil, a woven metal fabric, a perforated sheet, or the like. In accordance with a non-limiting embodiment, the second shielding material 16 may be a copper foil material having a weight of between 0.02 to 0.05 lb/ft$^2$. More specifically, the second shielding material may be a copper foil material having a weight of between 0.02 and 0.035 lb/ft$^2$.

It is noted that the layer of the second shielding material 18 is contemplated to be thinner and thus lighter than the layer of the first shielding material 16. As a result, in the embodiment where the layer of the first shielding material 16 and the layer of the second shielding material 18 have the same compositional properties, the second shielding material 18 is contemplated to have a lower weight per unit area (e.g., a lower areal weight) than the first shielding material 16. In at least one non-limiting example, the layer of the second shielding material 18 is contemplated to dissipate electricity more slowly than the layer of the first shielding material 16. Accordingly, selected properties of the layer of the first shielding material 16 are enhanced by comparison with the layer of the second shielding material 18. At least for this reason, the layer of the first shielding material 16 also is referred to as an "enhanced shielding material 16."

With renewed reference to FIG. 1, it is contemplated that the first repair 10 will be effectuated in response to some damage to the layer of the first shielding material 16, the layer of the second shielding material 18, or both the layer of the first shielding material 16 and the layer of the second shielding material 18. In the illustrated embodiment, it is contemplated that both the layer of the first shielding material 16 and the layer of the second shielding material 18 have been damaged in some fashion, thereby requiring their reconstruction.

When effectuating the first repair 10, it is contemplated that the composite material 12 will first be prepared for the first repair 10. Specifically, it is contemplated that a portion of the layer of the first shielding material 16 around the damaged section will be removed. Similarly, where needed, a portion of the layer of the second shielding material 18 around the damaged section will be removed. To prepare (or pre-treat) the area for the first repair 10, scarfing may be employed to remove portions of the layer of the first shielding material 16 and/or the layer of the second shielding material 18. While scarfing is contemplated to be used, any other removal technique may be employed without departing from the scope of the present invention. For example, sanding and/or abrading may be employed. Other pretreatment operations include, but are not limited to removal of dirt, paint, primers, etc. Regardless of the technique(s) used, it is contemplated that the area for the first repair 10 will be prepared (or pre-treated) to facilitate the first repair 10.

While pre-treatment of the composite material 12 is contemplated to be employed to effectuate the first repair 10, it is possible that the damage to the layer of the first shielding material 16 and the layer of the second shielding material 18 may be of such a character that pre-treatment is not needed. Additionally, pre-treatment may not be required in instances where the composite material 12 does not incorporate a layer of shielding material 16, 18. The present invention is intended to encompass circumstances where pre-treatment is required and also circumstances where it is not.

Returning to FIG. 1, whether or not removed as part of a pre-treatment operation to the composite material 12, the removed portion of the layer of the first shielding material 16 establishes a first hole 20, with a first hole width 22, in the layer of the first shielding material 16. Similarly, the removed portion of the layer of the second shielding material 18 establishes a second hole 24, with a second hole width 26, in the layer of the second shielding material 18. As should be apparent, when a pretreatment operation is performed on the composite material 12 illustrated in FIG. 1, the damaged portion of the layer of the second shielding material 18 is removed prior to or simultaneously with the removal of the damaged portion of the layer of the first shielding material 16.

With respect to the first repair 10, a patch comprising a first layer 28 of the first shielding material 16 and a second layer 32 of the second shielding material is used. The first layer 28 of the patch comprises a first patch width 30 and the second layer 32 of the patch has a second patch width 34. While it is contemplated that the first layer 28 of the patch will be made from the same material as the first shielding material 16, the present invention does not require this. The first layer 28 of the patch may be made from a different material, with a different composition and construction, from the first shielding material 16. Similarly, the second layer 32 of the patch is contemplated to be made from the same material as the second shielding material 18. As with the first layer 28 of the patch, this arrangement is not required to practice the present invention. The second layer 32 of the patch may be made from a different material, with a different composition and construction, than the material of the second shielding material 18 without departing from the scope of the present invention.

Also with respect to FIG. 1, it is noted that the first hole width 22 is merely one of the dimensions that defines the total area of the first hole 20. Naturally, there is a depth dimension that is not depicted. Similarly, the second hole width 26, the first patch width 30, and the second patch width 34 are merely one of the dimensions that define the total area of the second hole 24, the first layer 28 of the patch, and the second layer 32 of the patch. For purposes of the present discussion, therefore, reference to the first hole width 22, the second hole width 26, the first patch width 30, and the second patch width 34 is intended also to refer to a first hole area (not illustrated), a second hole area (not illustrated), a first patch area (not illustrated), and a second patch area (not illustrated).

In connection with the first repair 10, it is contemplated that the repair 10 may involve the removal of a minimum length of 0.75 inches (19.05 mm) from the layer of the first shielding material 16. As noted above, removal of material from the layer of the first shielding material 16 may involve the use of a scarfing tool, sandpaper, or the like. In a contemplated embodiment, an edge of the area of the removed portion from the layer of first shielding material 16 may be a minimum of 0.5 inches (12.7 mm) from the edge of any fastener hole or countersink.

With continued reference to FIG. 1, it is contemplated that the first layer 28 of the patch may be shaped so that the first patch width 30 is coextensive with the first hole width 22. In other words, the first patch width 30 may be essentially equal to (or slightly smaller than) the first hole width 22.

For the illustrated first repair 10, the second patch width 34 may be greater than the second hole width 26. Moreover, the second layer 32 of the patch may overlap the first patch 28 by 1.0 to 3.0 inches (25.4 to 76.20 mm) on all sides. It is noted that the overlap alternatively may fall within one of the following ranges: 1.25-2.75 inches (31.75-69.85 mm), 1.50-2.50 inches (38.10-63.5 mm), 1.75-2.25 inches (44.45-57.15 mm). In addition, the overlap may be about 2.00 inches (50.8 mm).

Figure 2:
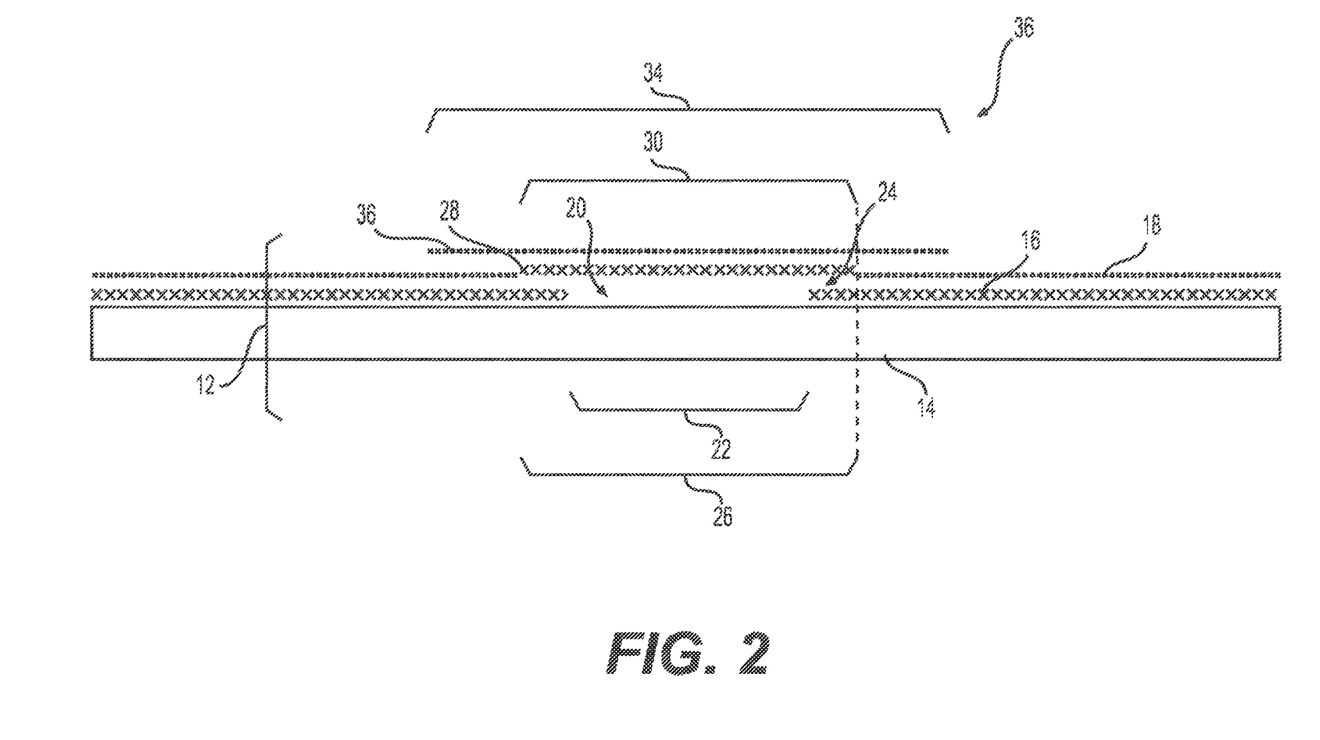
FIG. 2 is a graphical, side view of a second embodiment of a repair according to the teachings of the present invention.

FIG. 2 illustrates a second repair 36 according to a second embodiment of the present invention. Here, the structures are, for the most part, the same as described and illustrated in FIG. 1. However, for the second repair 36, the size of the first layer 28 of the patch is greater than the size of the first hole 20. In particular, with reference to FIG. 2, it is noted that the first patch width 30 is greater than the first hole width 22. As in the first embodiment, the second patch width 34 is greater than the second hole width 26.

The construction of the first repair 10 differs intentionally from the construction of the second repair 36 for at least one reason. It is contemplated that the first repair 10 will be employed on areas of the aircraft that are aerodynamically sensitive or are subject to less stringent EMI requirements. The second repair 36, by contrast, is contemplated to be employed on areas of the aircraft that are not aerodynamically sensitive or are subject to more stringent EMI requirements.

As should be apparent to those skilled in the art, there are areas on the aircraft where small changes in the shape of the surface of the aircraft may have a large impact on the aerodynamic properties of the aircraft. Selected surfaces of the wings and other control surfaces fall into this category. So that the first repair 10 has a minimal impact on the shape of the aerodynamic surface, the first patch width 30 is tailored to substantially match the first hole width 22. In this way, it is possible to effectuate the first repair 10 of the composite material 12 with either no impact or a minimal impact on the aerodynamic properties of the surface of the composite material 12.

The repair 36 is contemplated to be applied to areas of the composite material 12 that are less aerodynamically sensitive or subject to more stringent EMI requirements. A portion of the fuselage of an aircraft may present such an area, as should be apparent to those skilled in the art. In such areas, the first patch width 30 may exceed the first hole width 22. It is contemplated that, with respect to the second repair 36, the second repair 36 may leave a slight, visible bump on the surface of the composite material 12, when the second repair 36 is complete.

Figure 3:
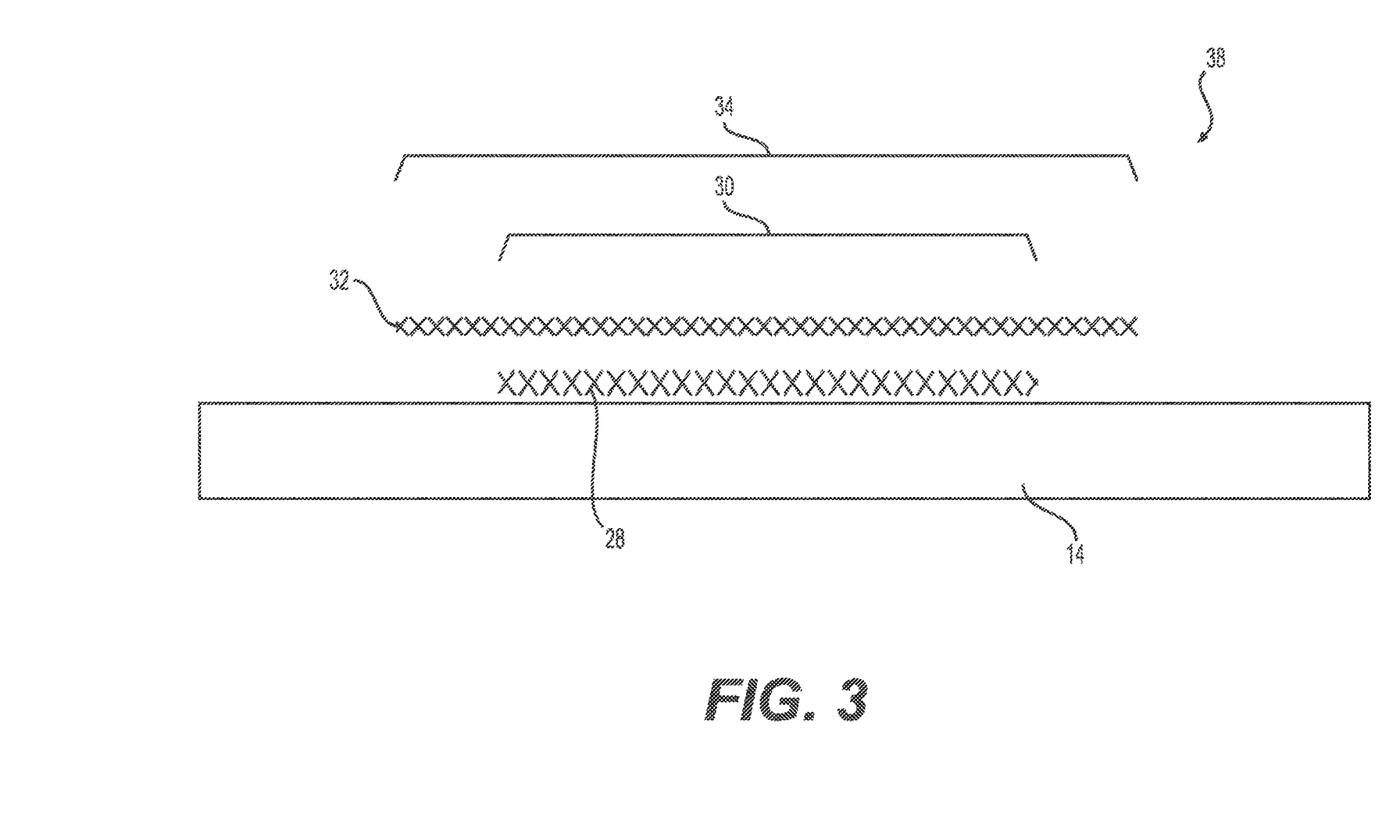
FIG. 3 is a graphical, side view of a third embodiment of a repair according to the teachings of the present invention.

FIG. 3 illustrates a third repair 38 according to a third embodiment of the present invention. Here, the structures also are, for the most part, the same as those described and illustrated in connection with FIG. 1 and FIG. 2. However, for the third repair 38, there is no layer of the first shielding material 16 on the composite substrate 14 in the region of the repair 10. This repair 38 is contemplated to be performed in regions of the composite substrate 14 where there may not be any underlying enhanced shielding material 16. However, due to a repair where mechanical fasteners are used to secure a patch to the composite substrate 14, it may be desirable to include a patch that includes the enhanced shielding material 16 in the region of the repair in order to ensure good electrical conductivity between the repair patch and the existing shielding material. 16.

With respect to the third repair 38, it is contemplated that the composite material will include a layer of the second shielding material 18 on the composite substrate 14. Accordingly, while not illustrated, the present invention also is contemplated to encompass this embodiment.

For this third repair 38, the first layer 28 of the patch with a first patch width 30 is bonded to the composite substrate 14. Optionally, a second layer 32 of the patch with a second patch width 34 is bonded to the composite substrate 14, above the first layer 28 of the patch. While both the first layer 28 of the patch and the second layer 32 of the patch are illustrated in this embodiment, the present invention contemplates that only one of the first layer 28 of the patch or the second layer 32 of the patch may be employed by itself.

In addition, for the third repair 38, it is contemplated that the first patch width 30 will be greater than the second patch width 34. In alternative contemplated embodiments, the first patch width 30 may be equal to the second patch width 34. In still further contemplated embodiments, the second patch width 34 may be less than the first patch width 30.

Regardless of the repair 10, 36, 38 employed, it is contemplated that the repairs 10, 36, 38 will require little or no post-curing processing. In other words, the repairs 10, 36, 38 are contemplated to provide suitable surface finishes, after the resin cures. The present invention, however, does not preclude some post-curing processing, including some sanding and surface finishing, for example.

Figure 4:
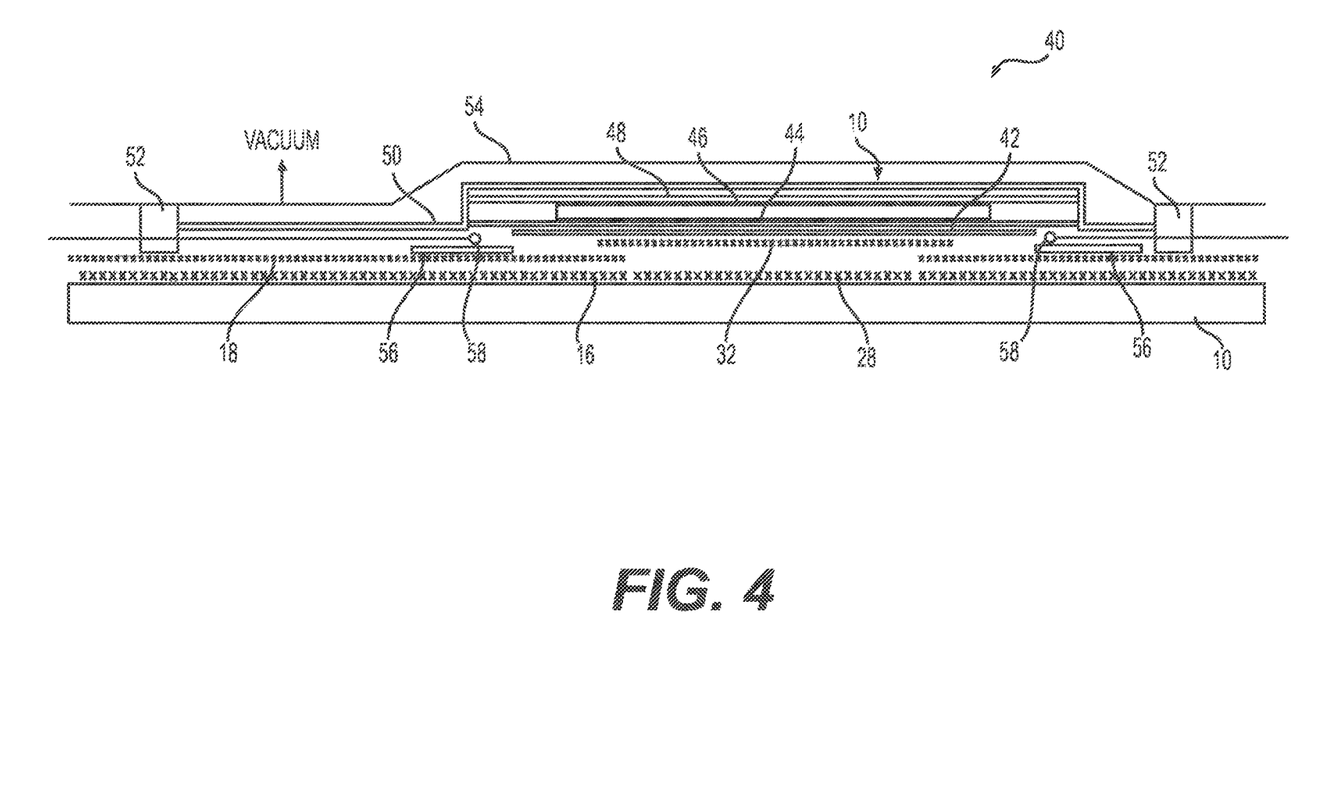
FIG. 4 is a graphical, side view of selected equipment contemplated to be used to effectuate the first embodiment of the repair illustrated in FIG. 1.

FIG. 4 is a graphical, side view of one embodiment of a repair suite 40 contemplated to assist with effectuating the repairs 10, 36, 38 illustrated in FIGS. 1-3. The repair suite 40 includes a number of components, some or all of which are helpful in effectuating the repairs 10, 36, 38. To facilitate the discussion of embodiments of the repair method 60, below, an overview of the components of the repair suite 40 is first provided.

While the same repair suite 40 may be used to effectuate both repairs 10, 36, 38, for discussion purposes, the repair suite 40 is illustrated in connection only with the first repair 10 illustrated in FIG. 1.

The repair suite 40 includes a consumable fabric 42 that is placed atop the first repair 10. The consumable fabric 42 may be positioned in contact with the resin used for the repair. More specifically, the consumable fabric 42 may be positioned in contact with the resin and patch assembly used for the repair. Without limiting the present invention, the consumable fabric 42 may be a polytetrafluoroethylene ("PTFE") coated glass fabric or similar fabric. The consumable fabric 42 is contemplated to exhibit a suitable absorptive capacity for the resin being utilized. As such, the consumable fabric 42 may also be a porous fabric.

One example of a porous PTFE coated consumable fabric 42 that may be employed is Porous Release Ease TFG 250P, a product manufactured and sold by Airtech, a company also known as Tygavac Advanced Materials Ltd., with a business address at The Causeway, Broadway Business Park, Chadderton, Oldham OL9 9XD, United Kingdom. The porous PTFE coated consumable fabric 42 may have any suitable thickness. If the Tygavac TFG 250P material is used, that porous PTFE coated consumable fabric 42 has a thickness of 0.010 inches (0.254 mm). As should be apparent, other porous PTFE coated consumable fabrics 42 may be employed without departing from the scope of the present invention.

The porous PTFE coated consumable fabric 42 permits removal of an appropriate amount of the resin such that the repairs 10, 36, 38 are fully bonded and encapsulated with the resin without requiring removal of excessive amounts of the resin after curing. This may be done by virtue of having a desired absorptive capacity. In addition, the porous PTFE coated consumable fabric 42 possesses selected properties that discourage adhesion of the porous PTFE coated consumable fabric 42 to the resin and, therefore, to the first repair 10. A porous PTFE coated consumable fabric 42 permits gases to pass there through during curing. Gases include, but are not limited to volatile gases and air, as should be appreciated by those skilled in the art.

The porous PTFE coated consumable fabric 42 also establishes a suitable surface, after the resin cures. A suitable surface is one that does not require an excessive amount of post-cure surface treatment, such as sanding, buffing, or the like.

A first release film 44 is positioned atop the porous PTFE coated consumable fabric 42. The first release film 44 is contemplated to be made from a material that tends to discourage the passage of gases there through. As such, the first release film 44 may be a liquid and/or gas impermeable material. As should be apparent, other types of release films 44 may be employed without departing from the scope of the present invention.

A caul plate 46 is contemplated to be positioned above the first release film 44. The caul plate 46 is contemplated to be a solid structure that compliments the shape of the structure surrounding the first repair 10. The caul plate 46 may be made from a material, such as metal or rubber, or any other suitable material without departing from the scope of the present invention.

A second release film 48 is contemplated to be positioned above the caul plate 46. The second release film 48 is contemplated to be made from the same material as the first release film 44. As may be appreciated, the composition of the second release film 48 may differ from the composition of the first release film 44 without departing from the scope of the present invention.

A breather 50 is positioned atop the second release film 48. The breather 50 permits, among other things, the evacuation of gases, including volatile gases and air, that are generated during the cure of the resin applied to the first repair 10 and minimize any post-repair rework.

A vacuum bag 54 is placed over the breather 50. The vacuum bag 54 is contemplated to permit the application of a vacuum to the space under the breather 50. To secure the vacuum bag 54 at the periphery or the repair 10, a sealant tape 52 may be employed. The arrangement of the consumable fabric 42, the release films 46, 48, the caul plate 46 and the breather 50 underneath the vacuum bag 54 is commonly referred to in the industry as a bag-up.

The present invention contemplates the application of a vacuum of approximately 21 inches of mercury (Hg) (533.40 mm Hg). However, a vacuum of greater or lesser magnitude may be applied without departing from the scope of the present invention. For example, the vacuum applied to cure the resin may be within a range of ±2.5% of 21 mm (0.83 inches) of mercury, ±5.0% of 21 mm (0.83 inches) of mercury, or ±10.0% of 21 mm (0.83 inches) of mercury.

The repair suite 40 also is contemplated to include a tape 56 that surrounds the repair. The tape may be polytetrafluoroethylene ("PTFE") tape that is easily removed from the composite material 12 after completing the first repair 10.

One or more thermocouples 58 may be positioned around the first repair 10 to monitor heat applied to the first repair 10 and, thereby, to assist with during of the resin in the first repair 10. For certain resin cures, it may not be necessary to rely on thermocouples 58. Accordingly, while thermocouples 58 are contemplated to be employed to monitor the cure of the resin, the thermocouples 58 are not required to practice the present invention.

As should be apparent to those skilled in the art, heat may be applied to the repair 10 during the cure by any of a number of different methodologies. In one non-limiting example, heat lamps may be employed.

One embodiment of a repair method 60 will now be described in connection with the repairs 10, 36, 38 and the repair suite 40 described above. It is noted, however, that that the repair method 60 described herein is contemplated to be applicable to composite materials 12 manufactured using a Resin Transfer Infusion ("RTI") process. While contemplated for composite materials 12 manufactured via an RTI process, the present invention is contemplated also to have applicability to composite materials 12 that are manufactured according to processes other than the RTI process.

It is noted that the method described in connection with the present invention may be preceded by one or more steps that may be considered prudent. For example, one preliminary operation may include identifying the extent of the damage. In some cases, all that may be required is a visual inspection. In other cases, it may be necessary to use one or more instruments to assess the lateral dimensions of the damage as well as the depth of the damage in the composite material 12.

In connection with assessing the damage, and as another preliminary step that may be required before effectuating a repair 10, 36, 38, it may be necessary to remove any paint, dirt, and/or surface coatings (i.e., primer) from the composite material 12. One or more solvents and/or water may be required for this operation.

In addition, it is contemplated that there may be other preliminary operations that may be desirable to be performed prior to implementing one of the methods described below.

Figure 5:
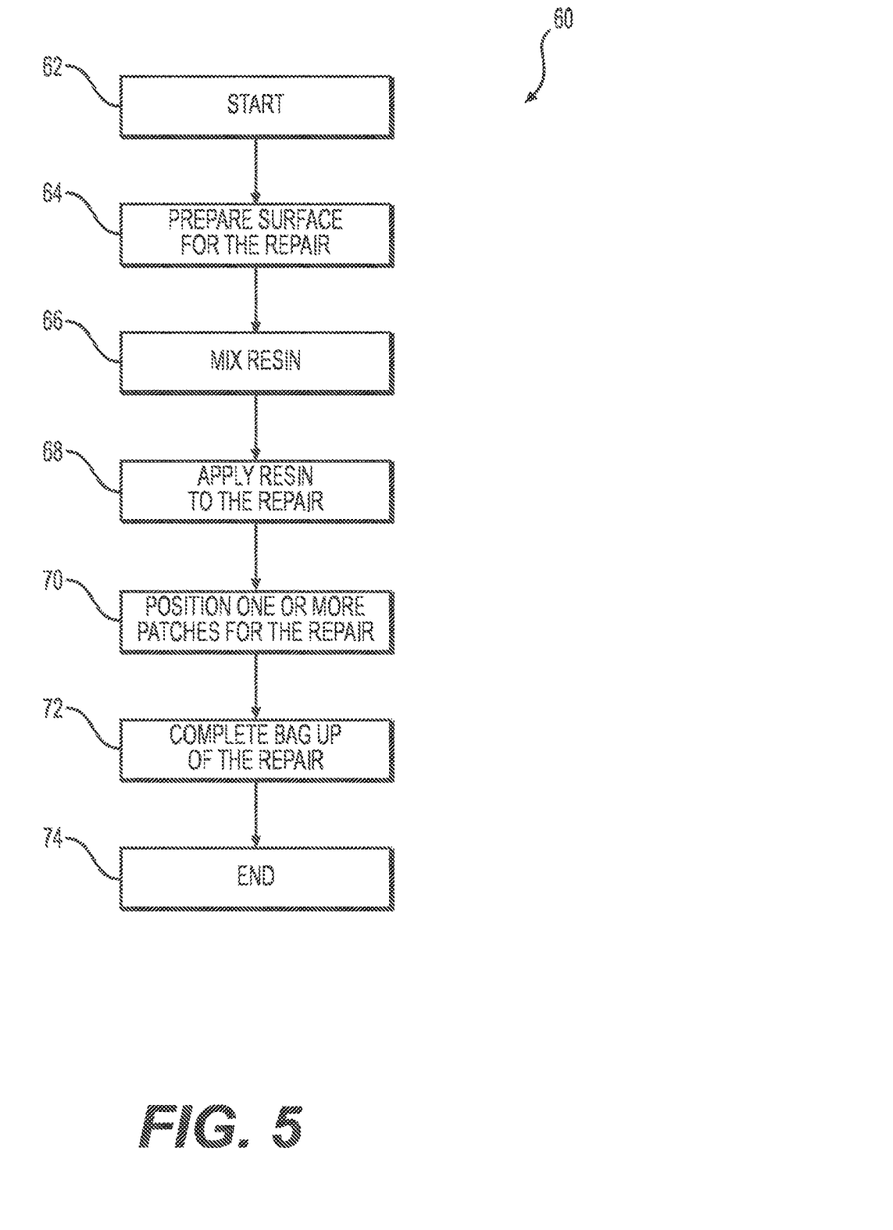
FIG. 5 is a flow chart illustrating one embodiment of a method according to the present invention.

FIG. 5 provides a flow chart that outlines a first embodiment of a method 60 for effectuating the first repair 10 illustrated in FIG. 1. The method 60 is equally applicable to the second repair 36 and the third repair 38.

The method 60 starts at block 62.

At block 64, the surface of the composite material 12 is prepared for the repair 10, 36, 38. As noted above, this may include any number of operations including removal of dirt, paint, and primer, scarfing the area of the damage, sanding, etc. Where scarfing is employed, a suitable scarfing device includes, but is not limited to, GMI 'Leslie' portable scarfing equipment fitted with a diamond cutter. GMI refers to GMI Aero, with a business address at 9 rue buffault, 75009 Paris 9e, France. Where sanding is employed, a 240 grit sandpaper is considered to be acceptable but not limiting of the present invention.

When removing a portion of the layer of the first shielding material 16, it is understood that the underlying carbon fiber plies in the composite substrate 12 are not to be disturbed so as not to alter the properties of the composite substrate 12. Accordingly, careful remove of the damaged portion of the layer of the first shielding material 16 is recommended. Additionally, it may be prudent to abrade gently the surface of composite substrate 12 (e.g., with a 240 grit sandpaper) to prepare the surface of the composite substrate 12 for the repair 10, 36, 38.

The method 60 proceeds to block 66 from block 64. At block 66, the resin is mixed. The resin may be any suitable resin employable for the repair 10, 36, 38. In one non-limiting embodiment, the resin will be mixed such that the weight of the resin is about one half (0.5) of the combined weight of the patch comprising a first layer 28 of the first material and the second layer 32 of the second material. Since the first layer 28 of the patch and the second layer 32 of the patch are contemplated to be made from copper foil, as discussed above, it is contemplated that the weight of the resin will be about one half (0.5) of the weight of the copper foil being placed into the repair 10, 36, 38.

In other embodiments, it is contemplated that the ratio of the weight of the resin to the combined weight of the first and second layers 28, 32 of the patch will fall within a range of 0.49-0.51, within a range of 0.48-0.52, within a range of 0.47-0.53, within a range of 0.46-0.54, or within a range of 0.45-0.55. As should be apparent, the ratio is contemplated to be applicable regardless of the metal employed for construction of the first and second layers 28, 32 of the patch.

As noted above, it is contemplated that the first shielding material and the second shielding material will have the same compositional properties. In the non-limiting embodiment discussed herein the first and second layers 28, 32 of the patch are made from copper. If, however, the first and second layers 28, 32 of the patch are made from different materials, the combined weight of the first and second layers 28, 32 of the patch are applicable to the weight ratio used, as noted above. Accordingly, it is contemplated that resins with different compositions will be employed where the first and second layers 28, 32 of the patch are made from different materials.

The method proceeds from block 66 to block 68. At block 68, the resin is applied to the repair area, as appropriate for the repair 10, 36, 38. When applying the resin to the repair area, the resin is contemplated to be brushed onto the repair area, within the area surrounded by the tape 54. In addition, it is contemplated that the thickness of the resin applied to the repair area will be even and will be substantially equal to the thickness(es) of the first and second layers 28, 32 of the patch. As should be apparent, if only the second layer 32 of the patch is being applied to the repair area, the thickness of the resin will be less than the thickness where both the first and second layers 28, 32 of the patch are deposited into the repair area.

From block 68, the method proceeds to block 70. At block 70, one or more patches 28, 32 are positioned in the repair 10, 36, 38.

From block 70, the method 60 proceeds to block 72, where bag up of the repair 10, 36, 38 is completed. The bag up includes the placement of one or more components from the repair suite 40, as discussed above, including the positioning of the consumable fabric 42 as described above. Specifically, the consumable fabric 42 is positioned in contact with the resin (or the resin and patch assembly). More specifically, the consumable fabric 42 is positioned between the resin and patch assembly and the first release film 44. The resin is then cured and the repair suite 40 is removed.

Curing may or may not involve the application of heat. As such, it is contemplated that one or more external heat sources may be employed. As noted above, without limiting the present invention, heat lamps may be positioned adjacent to the repair 10, 36, 38 to assist with the cure of the resin.

In addition, the cure of the resin is contemplated to involve the application of a vacuum to the repair 10, 36, 38. As noted above, the repair suite 40 is contemplated to include a vacuum bag 54. The vacuum bag 54 is contemplated to be constructed so that a vacuum of about 21 mm (0.83 inches) of mercury (Hg) may be applied under the vacuum bag 54. While a vacuum of about 21 mm (0.83 inches) of mercury is contemplated, other magnitudes of vacuum are contemplated to apply to the present patent application, as noted above.

After block 72, the surface of the repair 10, 36, 38 optionally may be finished. Finishing may include operations such as sanding, priming, painting, etc. Finishing also may involve the use of solvent and/or water to clean the repair 10, 36, 38. For cosmetic reasons, it may also be necessary to locally apply resin, such as via a resin rub, for example, so that the surface of the repair 10, 36, 38 meets expectations and/or complies with applicable standards.

The method 60 ends at block 74.

There are perceived to be a number of non-limiting advantages to the method 60 of the present invention. In particular, it is contemplated that the dimensions of the repairs 10, 36, 38 may be quite large in one or more directions. For example, without limiting the present invention, it is contemplated that the method 60 may be used to effectuate a repair 10, 36, 38 that is one (1) meter (39.37 inches) or longer, depending on the location of the damage.

One additional non-limiting advantage of the present invention lies in the EMI properties of the repairs 10, 36, 38. In the case of the repairs 10, 36 in particular, the layers 28, 32 of the patch are sized and positioned such that they establish an electromagnetic interference performance with the layer of the first shielding material 16 and the layer of the second shielding material 18 of the composite material, that fall within predetermined parameters. In other words, the patch is positioned in proximity to the layer of the first shielding material 16 and the layer of the second shielding material 18 such that the patch repairs the damage to the layers of shielding materials 16, 18 of the composite material.

As noted above, the present invention is contemplated to encompass a ratio of a weight of a resin to a weight of the shielding material of the patch used for the repair 10, 36, 38. More specifically, the present invention is contemplated to encompass the bonding of shielding materials (in the form of the layers 28, 32 of the patch) to a composite substrate 14 using a predetermined ratio by weight of a mixed resin to the weight of the layers 28, 32 of the shielding material. The present invention contemplates that the layers 28, 32 of the patch are fully bonded to the composite substrate 14 and fully encapsulated within the resin, such that there is an adequately close contact between the layers of shielding materials 16, 18, on the composite material and the layers 28, 32 of shielding material of the patch to assure acceptable electromagnetic interference performance (meeting predetermined criteria), and that post cure rework of the repaired area 10, 36, 38 meets aerodynamic and cosmetic requirements with minimized additional effort.

Also as noted above, it is contemplated that the bonding of the layers 28, 32 of shielding material of the patch to the composite substrate 14 may or may not require the use of one or more consumable materials, such as one or more absorptive release films and/or fabrics (i.e., consumable fabric 42). Release films and/or fabrics 42 assist with the curing of the resin by assuring that excess resin is removed from the repair 10, 36, 38 prior to curing and that any bagging materials 54 employed during the curing process are not adhered to the cured resin. Absorptive release films and/or fabrics 42 also may help to minimize any post cure work to the repair area.

As noted above, the embodiment(s) described herein are intended to be exemplary of the wide breadth of the present invention. Variations and equivalents of the described embodiment(s) are intended to be encompassed by the present invention, as if described herein.

The invention claimed is:

1. A method for repairing damage to a composite material comprising a composite substrate and at least one layer of shielding material comprising a layer of a first shielding material and a layer of a second shielding material, the method comprising:
removing damage to the at least one layer of shielding material by creating a first hole in the layer of the first shielding material and by creating a second hole in the layer of the second shielding material;
applying a patch of shielding material in the region of the first hole and the second hole via a mixed resin, wherein the patch of shielding material comprises a first layer of a first patch shielding material and a second layer of a second patch shielding material, wherein the first patch shielding material has a greater weight per unit area than the second patch shielding material, and wherein a ratio of a mixed resin weight to a weight of the patch of shielding material lies in a range between about 0.45-0.55; and
curing the mixed resin, wherein an absorptive, consumable material is positioned in contact with the mixed resin during at least a portion of the curing.

2. The method of claim 1, wherein the second hole is larger than the first hole.

3. The method of claim 2, wherein the layer of the first shielding material is an enhanced layer of shielding material in comparison to the layer of the second shielding material, such that the second shielding material dissipates electricity more slowly than the first shielding material.

4. The method of claim 1, further comprising:
dimensioning the first layer of the patch to fit within the first hole.

5. The method of claim 1, further comprising:
dimensioning the first layer of the patch to be larger than the first hole.

6. The method of claim 1, wherein the second layer of the patch is dimensioned to be larger than the second hole, so as to overlie the layer of second shielding material of the composite material.

7. The method of claim 1, wherein the second layer of the patch is larger than the first layer of the patch by a minimum distance of between 1.0-3.0 inches (25.4-76.2 mm) on all sides.

8. The method of claim 3, wherein the first shielding material and the second shielding material comprise copper foil.

9. The method of claim 1, wherein the composite substrate comprises carbon fiber.

10. The method of claim 1, further comprising creating a bag up wherein the absorptive, consumable material is positioned between an assembly of the mixed resin and patch and a release film.

11. The method of claim 1, wherein the layer of the first shielding material is an enhanced layer of shielding material in comparison to the layer of the second shielding material, such that the second shielding material dissipates electricity more slowly than the first shielding material, the method further comprising:
dimensioning the first layer of the patch to fit within the first hole.

12. The method of claim 11, wherein the second layer of the patch is dimensioned to be larger than the second hole, so as to overlie the layer of the second shielding material of the composite material.

13. The method of claim 3, wherein the layer of the first shielding material is a metallic foil having a weight of between 0.1 to 0.5 lb/ft$^2$.

14. The method of claim 3, wherein the layer of the second shielding material is a metallic foil having a weight of between 0.02 to 0.05 lb/ft$^2$.

15. A method for repairing damage to a composite material comprising a composite substrate and at least one layer of shielding material, the method comprising:
removing damage to the at least one layer of shielding material by creating a hole in the at least one layer of shielding material; and
applying a patch of shielding material in the region of the hole via a mixed resin, the patch having a first layer of a first patch shielding material and a second layer of a second patch shielding material, the first patch shielding material being an enhanced shielding material in comparison to the second patch shielding material, such that the second patch shielding material dissipates electricity more slowly than the first patch shielding material,
wherein the second layer of the patch is dimensioned to be larger than the first layer of the patch, and larger than the hole so as to overlie the at least one layer of shielding material, and
wherein the first patch shielding material has a greater weight per unit area than the second patch shielding material.

16. The method of claim 15, further comprising:
curing the mixed resin, wherein an absorptive, consumable material is positioned in contact with the mixed resin during at least a portion of the curing; and
wherein a ratio of a mixed resin weight to a weight of the patch of shielding material lies in a range between about 0.45-0.55.

17. The method of claim 16, wherein the at least one layer of shielding material comprises a layer of a third shielding material and a layer of a fourth shielding material, the method further comprising:
creating a first hole in the layer of the third shielding material; and
creating a second hole in the layer of the fourth shielding material, the first hole being smaller than the second hole.

18. The method of claim 17, wherein the third shielding material is the same as the first shielding material and the fourth shielding material is the same as the second shielding material.

19. The method of claim 17, wherein the first layer of the patch is dimensioned to fit within the first hole.

20. The method of claim 19, wherein the first layer of the patch is dimensioned to be larger than the first hole.

21. The method of claim 17, wherein the second layer of the patch is dimensioned to be larger than the second hole.

22. The method of claim 15, wherein the first patch shielding material and the second patch shielding material comprise copper foil.

23. The method of claim 16, further comprising:
creating a bag up,
wherein the absorptive, consumable material is positioned between an assembly of the mixed resin and patch and a release film.

24. The method of claim 15, wherein the layer of the first patch shielding material is a metallic foil having a weight of between 0.1 to 0.5 lb/ft$^2$.

25. The method of claim 15, wherein the layer of the second patch shielding material is a metallic foil having a weight of between 0.02 to 0.05 lb/ft$^2$.

26. A method for repairing damage to a composite material that comprises a composite substrate, a layer of a first substrate shielding material and a layer of a second substrate shielding material, the method comprising:
creating a first hole in the layer of the first substrate shielding material;
creating a second hole in the layer of the second substrate shielding material, the second hole being larger than the first hole;
applying a patch of shielding material in the region of the first hole and the second hole via a mixed resin, the patch of shielding material comprising a first layer of a first patch shielding material and a second layer of a second patch shielding material, the first patch shielding material having a greater weight per unit area than the second patch shielding material,
wherein the second layer of the second patch shielding material is dimensioned to be larger than the second hole.

\* \* \* \* \*